Patented June 6, 1950

2,510,784

UNITED STATES PATENT OFFICE 2,510,784

BIS(TERTIARYAMINOALKYL)ARYLACETONITRILES AND THE CORRESPONDING ACIDS AND ESTERS

Philip Lucas, Middlesex County, Mass., assignor to Sterling Drug Inc., New York, N. Y., a corporation of Delaware No Drawing. Application January 13, 1949,
Serial No. 70,809

12 Claims. (Cl. 260—465)

This invention relates to new classes of arylacetonitriles, arylacetic acids and their esters which are substituted in the alpha-position by two tertiary-aminoalkyl groups, and to the preparation of these classes of compounds. These new compounds are useful as therapeutic agents and as intermediates for the preparation of substances with physiological activity.

My new compounds are prepared as follows. I have found that the alpha-hydrogens of an arylacetonitrile can be substituted with two moles of the same, or different tertiary-aminoalkyl halides in the presence of an excess of a strong metalating condensing agent such as sodium amide or sodium hydride to form a product with the general formula (I). Hydrolysis of the substituted acetonitrile (I) under vigorous conditions, i. e. with approximately 70% sulfuric acid gives the corresponding carboxylic acid (II). This acid (II) is readily converted to the corresponding lower alkyl esters (III) by esterification of the acid or a reactive derivative thereof such as the chloride or the anhydride, or by subjecting the nitrile to alcoholysis.

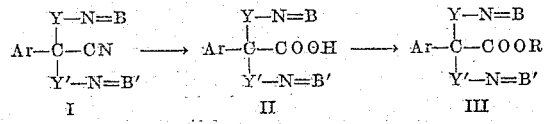

In the formulas shown immediately above, —N=B and —N=B' represent portions of the saturated secondary amines, HN=B and HN=B'; —Y— and —Y'— are lower alkylene groups such that at least two and preferably not more than five carbon atoms intervene between the nitrogen atom and the alpha-carbon atom; Ar is an aryl group, preferably having 1–2 aromatic rings; and R is a lower alkyl group, preferably having 1–5 carbon atoms.

The substitution of the alpha hydrogens of an arylacetonitrile can be effected in two steps, by reaction of approximately one equivalent of a tertiary-aminoalkyl halide, B=N—Y—X, where X is halogen and B=N— and Y have the meanings described above, carried out in contact with an excess of sodium amide suspended in an inert anhydrous organic solvent such as benzene, toluene or xylene. In this manner, a suspension containing the sodio derivative of the monosubstituted compound, Ar—CH(CN)—Y—N=B, is obtained. The second group is then introduced by adding about one equivalent of the tertiary-aminoalkyl halide, B'=N—Y'—X, to this suspension. In this fashion the compound of formula I is produced. When the two tertiary aminoalkyl groups to be introduced are different, a purer product can be obtained if the intermediate mono-substituted nitrile,

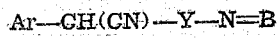

is isolated and purified by hydrolysis of its sodio-derivative and extraction and fractionation of the product to remove traces of unsubstituted material, Ar—CH$_2$—CN, and disubstituted material, Ar—CH(CN)—(Y—N=B)$_2$. The purified mono-substituted nitrile is then treated with B'=N—Y'—X by addition of the mixture of these two reactants to a fresh suspension of sodium amide.

If B is identical with B' and Y is identical with Y', the di-substitution can be carried out in one operation using approximately two equivalents of tertiary-aminoalkyl halide to one of the arylacetonitrile.

The order in which the reacting tertiary-aminoalkyl halide and the strong metalating agent are combined with the arylacetonitrile is generally immaterial, for in any case the actual reaction is between the tertiary-aminoalkyl halide and the alkali metal derivative of the arylacetonitrile.

The hydrolysis of the nitriles (I) to the acids (II) can be effected by refluxing the nitrile with approximately 70% sulfuric acid. A homogeneous mixture is produced, and the internal temperature at reflux is about 140° C. The time for hydrolysis varies from 1–70 hours depending upon the particular nitrile used.

The following equations will illustrate the process for preparing the compounds (I) and (II) of my invention; (1), where —Y—N=B and —Y'—N=B' are different, and (2), where —Y—N=B and —Y'—N=B' are the same.

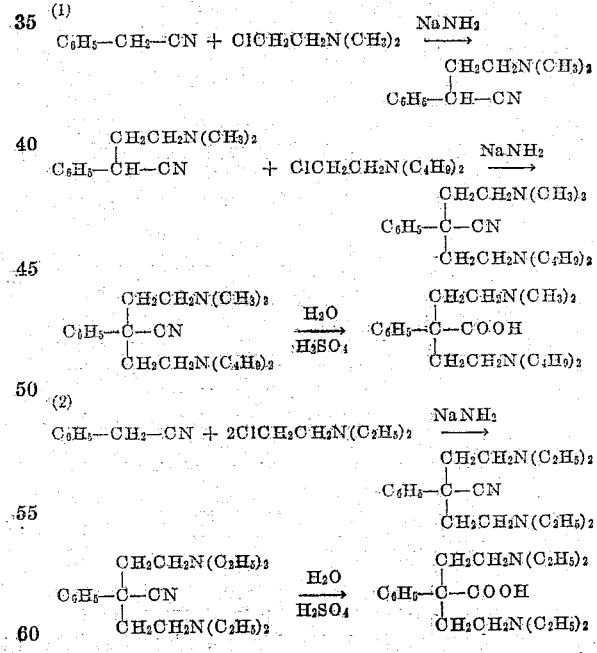

The arylacetonitriles which can be employed for preparation of my new compounds are in general any compounds of the formula ArCH2CN, where Ar is an aryl group devoid of substituents reactive with strong metalating agents. Thus the aryl group can bear one or more substituents such as halogen,

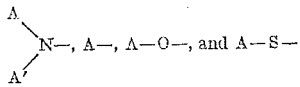

where A and A' are hydrocarbon radicals. For most practical purposes A and A' will not exceed about 18 carbon atoms. Thus the arylacetonitriles contemplated include for example phenylacetonitrile, m - methoxyphenylacetonitrile, p - chlorophenylacetonitrile, alpha - naphthylacetonitrile, p-xenylacetonitrile, etc. These nitriles, when carried through the described series of reactions with two equivalents of beta-dimethylaminoethyl chloride, for example, will produce bis(beta-dimethylaminoethyl) - phenylacetonitrile, bis(beta - dimethylaminoethyl) - m-methoxyphenylacetonitrile, bis(beta - dimethylaminoethyl) - p - chlorophenylacetonitrile, bis-(beta-dimethylaminoethyl) - alpha - naphthylacetonitrile and bis(beta-dimethylaminoethyl) - p-xenylacetonitrile respectively; and after hydrolysis, bis(beta-dimethylaminoethyl) - phenylacetic, bis(beta - dimethylaminoethyl) - m - methoxyphenylacetic, bis(beta - dimethylaminoethyl)-p-chlorophenylacetic, bis(beta - dimethylaminoethyl) - alpha - naphthylacetic, and bis-(beta-dimethylaminoethyl) - p - xenylacetic acids respectively.

The tertiary-aminoalkyl halides used can be of the dialkylaminoalkyl series or of the saturated N-heteroalkyl series in which the alkyl portion is joined to the nitrogen atom of a saturated heterocyclic ring such as that of piperidine, morpholine or pyrrolidine. Examples of such halides include 2-dimethylaminoethyl chloride, 3-dimethylaminopropyl bromide, 2-dimethylaminopropyl iodide, 4-dimethylaminobutyl chloride, 2-diethylaminoethyl chloride, 3-diethylaminopropyl chloride, 2-ethylmethylaminoethyl chloride, 2-dipropylaminoethyl chloride, 3-dipropylaminopropyl chloride, 2-dibutylaminoethyl chloride, 3-dibutylaminopropyl chloride, 2-diamylaminoethyl chloride, 2-dihexylaminoethyl chloride, 2-(N-piperidyl)-ethyl chloride, 3-(N-piperidyl)-propyl chloride, 2-pyrrolidyl)-ethyl chloride, 2-(N-morpholinyl)-ethyl chloride, etc. For most practical purposes the alkyl groups in the dialkyl amino portion of these halides will each not have more than about eight carbon atoms, and for most purposes lower alkyl of 1–5 carbon atoms is preferred.

Any combination of two such halides or two moles of the same one can be used to alkylate an arylacetonitrile. When two equivalents of any one of the halides named above are used to alkylate phenylacetonitrile, the following compounds are obtained respectively: bis(2-dimethylaminoethyl)phenylacetonitrile, bis(3-dimethylaminopropyl)phenylacetonitrile, bis(2-dimethylaminopropyl)phenylacetonitrile, bis(4-dimethylaminobutyl)phenylacetonitrile, bis(2 - diethylaminoethyl)phenylacetonitrile, bis(3-diethylaminopropyl)phenylacetonitrile, bis(2-ethylmethylaminoethyl)phenylacetonitrile, bis(2-dipropylaminoethyl)phenylacetonitrile, bis(3-dipropylaminopropyl)phenylacetonitrile, bis(2 - dibutylaminoethyl)phenylacetonitrile, bis(3 - dibutylaminopropyl)phenylacetonitrile, bis(2 - diamylaminoethyl)phenylacetonitrile, bis(2 - dihexylaminoethyl)phenylacetonitrile, bis[2 - (N - piperidyl)-ethyl]phenylacetonitrile, bis[3 - (N - piperidyl)-propyl]phenylacetonitrile, bis[2-(N-pyrrolidyl)-ethyl]phenylacetonitrile, and bis[2-(N-morpholinyl)-ethyl]phenylacetonitrile.

Hydrolysis of the above named substituted phenylacetonitriles with about 70% sulfuric acid gives the corresponding phenylacetic acids, and esterification of said acids with lower aliphatic alcohols or their equivalents as described below gives the respective alkyl phenylacetates.

The esters of Formula III are prepared by any one of the following methods:

(1) The acid (II) is reacted directly with a lower aliphatic alcohol with or without the use of a strong acid catalyst such as sulfuric acid.

(2) The acid halide or anhydride of the acid (II) is treated with a lower aliphatic alcohol.

(3) The acid (II) is reacted with a lower alkyl halide.

(4) A metal salt of the acid (II) is reacted with a lower alkyl halide.

(5) The acid (II) is reacted with a lower diazoalkane; this method is particularly suited for preparing the methyl ester.

(6) The nitrile (I) is hydrolyzed with a mixture of sulfuric acid and a lower aliphatic alcohol; this is essentially a variant of method (1).

The nitriles (I) and esters (III) are basic in character and can readily be converted to acid addition or quaternary ammonium salts in which either one or both of the tertiary-amino groups are involved. The acids (II) are amphoteric and form acid addition and quaternary ammonium salts on the one hand, and metallic salts involving the carboxyl group on the other.

Acid addition salts can be made by reaction of the free base with strong or moderately strong acids such as hydrochloric acid, hydrobromic acid, hydriodic acid, sulfuric acid, citric acid, tartaric acid, lactic acid, sulfamic acid, ethanesulfonic acid, etc. to form respectively hydrochlorides, hydrobromides, hydroiodides, sulfates or bisulfates, citrates, tartrates or bitartrates, lactates, sulfamates and ethanesulfonates. Readily obtainable quaternary salts are those derived from addition of lower alkyl and aralkyl esters of strong acids such as methyl chloride, methyl bromide, methyl iodide, ethyl bromide, ethyl iodide, propyl bromide, propyl iodide, benzyl chloride, benzyl bromide, methyl sulfate, methyl benzenesulfonate, methyl p-toluenesulfonate, etc., to form respectively methochlorides, methobromides, methiodides, ethobromides, ethiodides, propobromides, propiodides, benzochlorides, benzobromides, methosulfates, methobenzenesulfonates and metho-p-toluenesulfonates.

The following examples further illustrate my invention, but should not be construed as a limitation thereto.

EXAMPLE 1

(a) *Bis(beta-diethylaminoethyl) phenylacetonitrile*

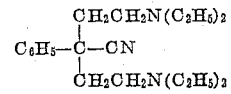

In a 2 liter, round-bottomed flask fitted with a stirrer, thermometer, and reflux condenser were placed 117 g. (1 mole) of phenylacetonitrile, 305 g. (2.25 moles) of beta-diethylaminoethyl chloride, and 1 liter of toluene. This mixture was warmed to 50° C. and 97.5 g. (2.5 moles) of sodium amide was added in portions at such a rate that, with cooling, the temperature of the mixture was held between 50° and 70° C. The time for addition was approximately 45 minutes.

With stirring continued, the reaction mixture was refluxed for ten hours. It was then cooled and 75 ml. of alcohol was added to decompose any excess sodium amide. The toluene solution was decanted from a small solid residue, washed with two 150 ml. portions of saturated aqueous sodium chloride solution, and dried over anhydrous potassium carbonate.

The toluene and alcohol in the solution were removed by distillation under the slight vacuum provided by a water aspirator, and the residue was fractionated in high vacuo. The 256 g. portion boiling at 135–138° C. (0.08 mm.) was pure bis(beta-diethylaminoethyl)phenylacetonitrile. The yield was 81% of the theoretical amount.

Anal. amino nitrogen: calcd., 8.88; found, 8.69.

(b) *Bis(beta-diethylaminoethyl)phenylacetic acid*

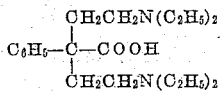

To a cold solution of 287 ml. of concentrated sulfuric acid in 196 ml. of water (70% sulfuric acid by weight) was added 196 g. (0.62 mole) of bis(beta-diethylaminoethyl)phenylacetonitrile. The resulting solution was heated at 145° C. (gentle reflux) for two hours, cooled, and poured into a mixture of 500 ml. of cracked ice and 750 ml. of water. This mixture was made strongly alkaline with 35% sodium hydroxide. The sodium salt of the amino acid separated partially at this point due to salting-out effects and was collected by filtration. The filtrate was adjusted to a pH of 7 with hydrochloric acid and the free amino acid which separated was collected by filtration, washed with water and dried. The sodium salt, separated above, was dissolved in a minimum amount of water and the pH adjusted to 7. The precipitated amino acid was collected by filtration, washed with water and dried. The total quantity of slightly impure bis(beta-diethylaminoethyl)phenylacetic acid isolated thus was 174 g. or 84% of the theoretical amount. A sample, after one recrystallization from water, melted at 175–8° C. when heated from room temperature but when put into the bath at 165° C., the solid melted, resolidified, and then melted at 175–6° C.

Anal. nitrogen: calcd., 8.39; found, 8.21.

(c) *Ethyl bis(beta-diethylaminoethyl)phenylacetate*

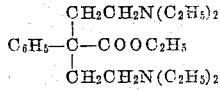

A solution of 40 g. of bis(beta-diethylaminoethyl)phenylacetonitrile in 59.5 cc. of concentrated sulfuric acid and 119 cc. of ethyl alcohol was stirred under reflux for 22 hours. Diethyl ether, formed by reaction of the alcohol and sulfuric acid was bled off through the condenser at intervals. The esterification mixture was cooled by adding to ice and made alkaline to phenolphthalein with sodium hydroxide solution. The oil which separated was extracted with ether, and the extracts were washed successively with 10% potassium carbonate solution, water and saturated sodium chloride solution, and dried over anhydrous sodium sulfate. After removal of the solvent, the residue was fractionated giving 29.5 g. of ethyl bis(beta-diethylaminoethyl)-phenylacetate, B. P. 151–153° C. (1 mm.).

EXAMPLE 2

(a) *Bis(beta-dimethylaminoethyl)phenylacetonitrile*

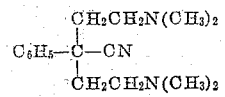

was prepared by the method described in Example 1, part (a), starting with phenylacetonitrile and beta-dimethylaminoethyl chloride. The reaction of 47 g. of beta-dimethylaminoethyl chloride and 23.4 g. of phenylacetonitrile gave 28.5 g. of product, B. P. 108–112° C. (0.2 mm.).

Anal. amino nitrogen: calcd., 10.80; found, 10.45.

EXAMPLE 3

(a) *Beta-dimethylaminoethyl-beta-dibutyl-aminoethyl-phenylacetonitrile*

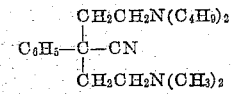

This compound was prepared by a method similar to that described in Example 1, part (a), except that it was desirable to carry out the reaction in two steps since the two dialkylamino groups are different. Instead of a ratio of 1 mole of phenylacetonitrile to 2.25 moles of dialkylaminoalkyl halide and 2.25 moles of sodium amide, the reaction was first carried out with a ratio of 1 mole of phenylacetonitrile to 1.1 mole of beta-dimethylaminoethyl chloride and about 1.5 mole of sodium amide. The product, beta-dimethylaminoethyl-phenylacetonitrile, had the B. P. 100–102° C. (0.3 mm.); $n_D^{25}=1.5056$.

This product was in turn reacted with 1.1 equivalents of beta-dibutylaminoethyl chloride (B. P. 114–115° C., 0.25 mm.) and about 1.5 equivalents of sodium amide. This gave the desired beta-dimethylaminoethyl-beta-dibutylamino-ethyl-phenylacetonitrile, B. P. 148–152° C. (0.15 mm.); $n_D^{25}=1.4915$, in 75% yield.

Anal. amino nitrogen: calcd., 8.16; found, 8.24.

(b) *Beta-dimethylaminoethyl-beta-dibutyl-aminoethyl-phenylacetic acid*

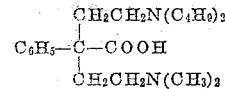

was prepared by the hydrolysis of the beta-dimethylaminoethyl-beta-dibutylaminoethyl-phenylacetonitrile by the method described in Example 1, part (b). The hydrolysis mixture was refluxed for 40 hours. The melting point of the pure beta-dimethylaminoethyl-beta-dibutylaminoethyl-phenylacetic acid was 197–198° C. and it was obtained in 62% yield.

Anal. nitrogen: calcd., 7.73; found, 7.64.

EXAMPLE 4

(a) *Bis(gamma-diethylaminopropyl)phenylacetonitrile*

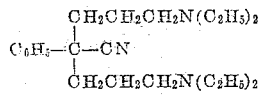

was prepared by the method described in Example 1, part (a), starting with phenylacetonitrile and gamma-diethylaminopropyl chloride. The product was obtained in 80% yield and had the B. P. 172–175° C. (0.03 mm.); $n_D^{25}=1.4940$.

Anal. amino nitrogen: Calcd., 8.15; found, 8.28.

(b) *Bis(gamma-diethylaminopropyl)phenylacetic acid* was prepared by the hydrolysis of bis(gamma-diethylaminopropyl)phenylacetonitrile by the method of Example 1, part (b). The reaction was heated for 65 hours. The acid product, obtained in 76% yield, had the M. P. 102–105° C.

Anal. nitrogen: calcd., 7.73; found, 7.59.

Its dihydrochloride had the M. P. 127–130° C.

Anal. chlorine: calcd., 16.24; found, 15.97.

(c) *Ethyl bis(gamma-diethylaminopropyl)-phenylacetate*

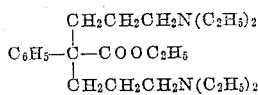

A mixture of 30 ml. of thionyl chloride and 15 g. of bis(gamma-diethylaminopropyl)phenylacetic acid was refluxed for one hour. The excess thionyl chloride was removed at reduced pressure, and the residue of acid chloride was refluxed with 75 ml. of alcohol for one hour. The excess alcohol was removed, the residue dissolved in water and the solution made alkaline and the oily product extracted with ether. After drying over anhydrous potassium carbonate, the ether was removed and the product distilled giving 11.2 g. (70%) of the ethyl ester of bis(gamma-diethylaminopropyl)phenylacetic acid, B. P. 149–151° C. (0.05 mm.); $n_D^{25}=1.4902$.

Anal.: Calcd. for $C_{24}H_{42}N_2O_2$; N, 7.18. Found: N, 7.35.

EXAMPLE 5

(a) *Beta-dimethylaminoethyl-beta-diethylaminoethyl-phenylacetonitrile*

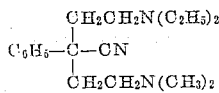

was prepared in a manner analogous to that described in Example 3, part (a). First phenylacetonitrile was reacted with beta-dimethylaminoethyl chloride to give beta-dimethylaminoethyl-phenylacetonitrile. This, in turn, was reacted with beta-diethylaminoethyl chloride to produce the desired unsymmetrical nitrile in 58% yield, B. P. 124–131° C. (0.3 mm.); $n_D^{25}=1.5018$.

Anal. amino nitrogen: calcd., 9.74; found, 9.53.

I claim:

1. In the process of preparing an alpha,alpha-bis(tertiary-aminoalkyl)arylacetonitrile, the step which comprises reacting an alkali metal derivative of an alpha-(tertiary-aminoalkyl)arylacetonitrile with about one equivalent of a tertiary-aminoalkyl halide.

2. In the process of preparing an alpha,alpha-bis(tertiary-aminoalkyl)phenylacetonitrile, the step which comprises reacting the sodio derivative of an alpha-(tertiary-aminoalkyl)phenylacetonitrile with about one equivalent of a tertiary-aminoalkyl halide.

3. The process of preparing bis(beta-dimethylaminoethyl)phenylacetonitrile having the formula

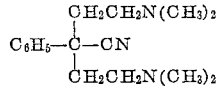

which comprises reacting the sodio derivative of alpha-(beta-dimethylaminoethyl)phenylacetonitrile with about one equivalent of a beta-dimethylaminoethyl halide.

4. A compound of the group consisting of alpha,alpha-bis(tertiary-aminoalkyl)arylacetic acids, the corresponding nitriles, the corresponding lower alkyl esters and the salts of said acids, nitriles and esters.

5. An alpha,alpha-bis(tertiary-aminoalkyl)-arylacetonitrile and salts thereof.

6. An alpha,alpha-bis(tertiary-aminoalkyl)-phenylacetonitrile and salts thereof.

7. A compound of the formula

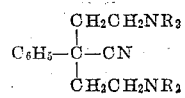

where R is a lower alkyl group and salts thereof.

8. Bis(beta-dimethylaminoethyl) phenylacetonitrile having the formula

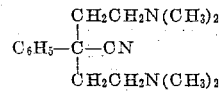

and salts thereof.

9. Bis(beta-diethylaminoethyl)phenylacetonitrile having the formula

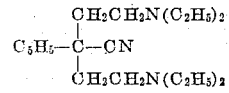

and salts thereof.

10. Bis(gamma-diethylaminopropyl)phenylacetonitrile having the formula

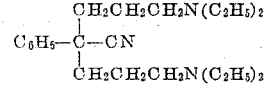

and salts thereof.

11. Beta-dimethylaminoethyl-beta-dibutyl-aminoethyl-phenylacetonitrile having the formula

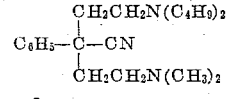

and salts thereof.

12. Beta-dimethylaminoethyl-beta-diethyl-aminoethyl-phenylacetonitrile having the formula

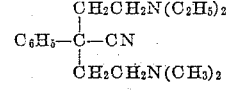

and salts thereof.

PHILIP LUCAS.

REFERENCES CITED

The following references are of record in the file of this patent:

UNITED STATES PATENTS

| Number | Name | Date |
| --- | --- | --- |
| 2,185,661 | Corell et al. | Jan. 2, 1940 |
| 2,230,774 | Bockmuhl et al. | Feb. 4, 1941 |
| 2,370,015 | Dalmer et al. | Feb. 20, 1945 |
| 2,382,285 | Bergel et al. | Aug. 14, 1945 |
| 2,398,575 | Bergel et al. | Apr. 16, 1946 |
| 2,428,535 | Urist et al. | Oct. 7, 1947 |

FOREIGN PATENTS

| Number | Country | Date |
| --- | --- | --- |
| 552,065 | Great Britain | Mar. 22, 1943 |

Certificate of Correction

Patent No. 2,510,784                                   June 6, 1950

PHILIP LUCAS

It is hereby certified that errors appear in the printed specification of the above numbered patent requiring correction as follows:

Column 6, line 44, for "0.25 mm." read *0.24 mm.*; column 8, line 30, for that portion of the formula reading "$C_5H_5$" read $C_6H_5$; line 37, for "$C_8H_6$" read $C_6H_5$; and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*